US008485585B2

(12) United States Patent
Taniguchi et al.

(10) Patent No.: US 8,485,585 B2
(45) Date of Patent: Jul. 16, 2013

(54) PUSH-UP DEVICE

(75) Inventors: Katsuhiko Taniguchi, Haryana (IN);
Katsuhito Kurachi, Haryana (IN)

(73) Assignee: Nifco Inc., Yokohama-Shi (JP)

( * ) Notice: Subject to any disclaimer, the term of this patent is extended or adjusted under 35 U.S.C. 154(b) by 0 days.

(21) Appl. No.: 13/378,520

(22) PCT Filed: Jun. 24, 2010

(86) PCT No.: PCT/JP2010/060783
§ 371 (c)(1),
(2), (4) Date: Feb. 23, 2012

(87) PCT Pub. No.: WO2010/150858
PCT Pub. Date: Dec. 29, 2010

(65) Prior Publication Data
US 2012/0167472 A1 Jul. 5, 2012

(30) Foreign Application Priority Data
Jun. 25, 2009 (JP) .................. 2009-151050

(51) Int. Cl.
*B60K 15/05* (2006.01)
(52) U.S. Cl.
USPC ........................ 296/97.22; 49/326; 312/319.2
(58) Field of Classification Search
USPC ........................ 296/97.22; 49/326; 312/319.2
See application file for complete search history.

(56) References Cited

U.S. PATENT DOCUMENTS 5,836,638 A * 11/1998 Slocum ...................... 296/97.22
2009/0139991 A1 6/2009 Nakaya

FOREIGN PATENT DOCUMENTS

| DE | 196 50 594 A1 | 6/1998 |
| EP | 2017112 A1 | 1/2009 |
| JP | U S57-180071 | 11/1982 |
| JP | U S60-68162 | 5/1985 |
| JP | 2007 290573 A | 11/2007 |
| WO | WO 2008/031814 A1 | 3/2008 |

OTHER PUBLICATIONS

European Patent Office, "European Search Report for EP 10 79 2176" Jan. 3, 2013.

* cited by examiner

*Primary Examiner* — Dennis Pedder
(74) *Attorney, Agent, or Firm* — Manabu Kanesaka

(57) ABSTRACT

A lock device includes a cam portion including a stationary-side cam; a rotor including a movable-side cam; a slide groove; a slide projection; an engagement projection; and a lock groove, in which the movable-side cam is disengaged from the stationary-side cam, so that the rotor rotates so as to allow the engagement projection that has been fitted in the lock portion to disengage from the lock portion. The urging device includes a spring, and a sleeve inserted to pass through a lower-side rod portion, positioned between the rotor and the spring, and also restricting a movement of the rod in a sliding direction in a lock position of the lock device (for example, a lock groove and an engagement projection, and the like).

4 Claims, 21 Drawing Sheets

70

73

PUSH-UP DEVICE

RELATED APPLICATIONS

The present application is National Phase of International Application No. PCT/JP2010/060783 filed Jun. 24, 2010, and claims priority from Japanese Application No. 2009-151050, filed Jun. 25, 2009.

TECHNICAL FIELD

The present invention relates to a push-up device for pushing out a fuel lid openably and closably attached to a vehicle body in an opening direction. In a lock position in which a rod is shortened, the push-up device can prevent the rod from freely sliding relative to a case.

BACKGROUND ART

Conventionally, there is well known a push-up device which forms a cam in the rod, and takes a lock-and-unlock posture every time the rod rotates one quarter relative to the case (for example, see paragraph [0019] and FIG. 2 of Patent Document 1).

PRIOR ART DOCUMENT

Patent Document

Patent Document 1: Japanese Patent Publication No. 2007-290573

DISCLOSURE OF THE INVENTION

Problems to be Solved by the Invention

However, in the aforementioned conventional push-up device, during a lock-and-unlock movement, there is a point at which the cam becomes free, so that there has been a problem that a malfunction may occur due to friction, torsion of a spring, and the like.

Therefore, the present invention is made in view of the problem that the aforementioned conventional technology has, and an object of the present invention is to eliminate the point at which the cam becomes free so as to be capable of preventing the malfunction of the push-up device.

Means for Solving the Problems

The present invention is made in order to achieve the aforementioned object, and has the following characteristics.

First, the present invention is a push-up device for pushing out a fuel lid openably and closably attached to a vehicle body (for example, an inner panel) in an opening direction.

Secondly, the push-up device comprises the following structure.

(1) Case

A case is fixed to a vehicle body (for example, the inner panel) side, and formed in a cylinder shape.

(2) Rod

A rod is slidably held inside the case, and protrudes from an inside of the case for pushing out the fuel lid.

(3) Urging Device (for Example, a Spring)

An urging device (for example, a spring) is positioned between the case and the rod for urging the rod toward a direction protruding from the inside of the case.

(4) Lock Device (for Example, a Lock Groove and an Engagement Projection, and the Like)

A lock device (for example, a lock groove and an engagement projection, and the like) is positioned between the case and the rod for locking the rod in a backward-movement position of the case against an urging force of the urging device (for example, the spring).

Thirdly, the lock device comprises the following structure.

(5) Cam Portion

A cam portion is positioned at some point along an axis direction of the rod, protrudes outwardly in a radial direction, and also includes a stationary-side cam formed in aback surface in a protruding direction of the rod.

(6) Rotor

A rotor is supported in a lower-side rod portion positioned at the back in a protruding direction as a border of the cam portion so as to be capable of rotating and sliding in the axis direction. The rotor includes a movable-side cam engaging the stationary-side cam of the cam portion, and disengaging by sliding of the rod for providing a rotational force in one direction.

(7) Slide Groove

A slide groove is positioned in one of either an outer circumferential surface of the cam portion or an inner circumferential surface of the case, and extends in a sliding direction of the rod.

(8) Slide Projection

A slide projection is positioned in the other of the outer circumferential surface of the cam portion or the inner circumferential surface of the case, and due to the sliding of the rod, relatively slides inside the slide groove so as to block a rotation of the rod relative to the case.

(9) Engagement Projection

An engagement projection protrudes from one of either the outer circumferential surface of the rotor or the inner circumferential surface of the case.

(10) Lock Groove

A lock groove is positioned in the other of the outer circumferential surface of the rotor or the inner circumferential surface of the case, and includes a lock portion in which the engagement projection is fitted in. The movable-side cam is disengaged from the stationary-side cam, so that the rotor rotates. As a result, the engagement projection that has been fitted in the lock portion can be disengaged from the lock portion.

Fourthly, the urging device comprises the following structure.

(11) Spring

The spring is inserted to pass through the lower-side rod portion, and elastically shrunk inside the case for urging the rotor toward the cam portion.

(12) Sleeve

A sleeve is inserted to pass through the lower-side rod portion, and positioned between the rotor and the spring for restricting a movement of the rod in the sliding direction in a lock position of the lock device (for example, the lock groove and the engagement projection, and the like).

The present invention may also comprise the following characteristics.

First, the sleeve comprises the following structure.

(1) Sleeve Main Body

A sleeve main body is inserted to pass through the lower-side rod portion, and formed in the cylinder shape.

(2) Projecting Portion

A projecting portion is positioned in an upper end portion of the sleeve main body abutting against the rotor, and projects outwardly in the radial direction.

(3) Contracted-Diameter Portion

A contracted-diameter portion is positioned in a lower end portion of the sleeve main body on a side opposite to the upper end portion, and protrudes inwardly in the radial direction.

Secondly, in the lower-side rod portion, there is provided a constricted portion which is made slim so that the contracted-diameter portion is fitted in.

Thirdly, in the constricted portion, in the axis direction of the constricted portion, there is provided a clearance which allows the contracted-diameter portion to slide according to a rising and descending amount of the rotor which rises and descends between a first height position in which the movable-side cam of the rotor is engaged with the stationary-side cam of the cam portion, and a second height position disengaging from the stationary-side cam.

Consequently, the clearance required for a cam operation can be ensured.

The present invention may further comprise the following characteristics.

Specifically, in the case, there is fixed a boot which can expand and contract so as to cover the upper-side rod portion positioned in front in the protruding direction of the rod as the border of the cam portion. Consequently, in a lock state wherein the rod is shortened, due to a reaction force of the boot, the rod can be prevented from freely sliding relative to the case.

The present invention may also comprise the following characteristics.

First, the case comprises the following structure.

(1) Cap

A cap is attached to an opening end portion positioned in front in the protruding direction of the rod.

Secondly, in the cap, the slide groove and the lock groove are provided.

Consequently, by providing the slide groove and the lock groove in the cap of the case, a structure of the case can be simplified.

Effect of the Invention

Since the present invention has the aforementioned structure, the following effect is obtained.

A point at which the cam becomes free is eliminated so as to be capable of preventing a malfunction of the push-up device.

Specifically, the sleeve, which has been inserted to pass through the rod, is positioned between the rotor including a movable-side cam portion engaging the stationary-side cam of the cam portion of the rod, and the spring urging the rotor toward the cam portion of the rod. As a result, in the lock position, the movement of the rod in the sliding direction can be restricted. Therefore, the rod moves in the sliding direction in the lock position, and the stationary-side cam and the movable-side cam portion are spaced apart so as to be capable of preventing from becoming free.

BRIEF DESCRIPTION OF THE DRAWINGS

FIGS. 7(a) and 7(b) correspond to FIGS. 6(a) and 6(b), and are explanatory drawings of a state wherein the rod is pushed in.

EMBODIMENTS FOR CARRYING OUT THE INVENTION (Push-Up Device 10)

Figure 1:
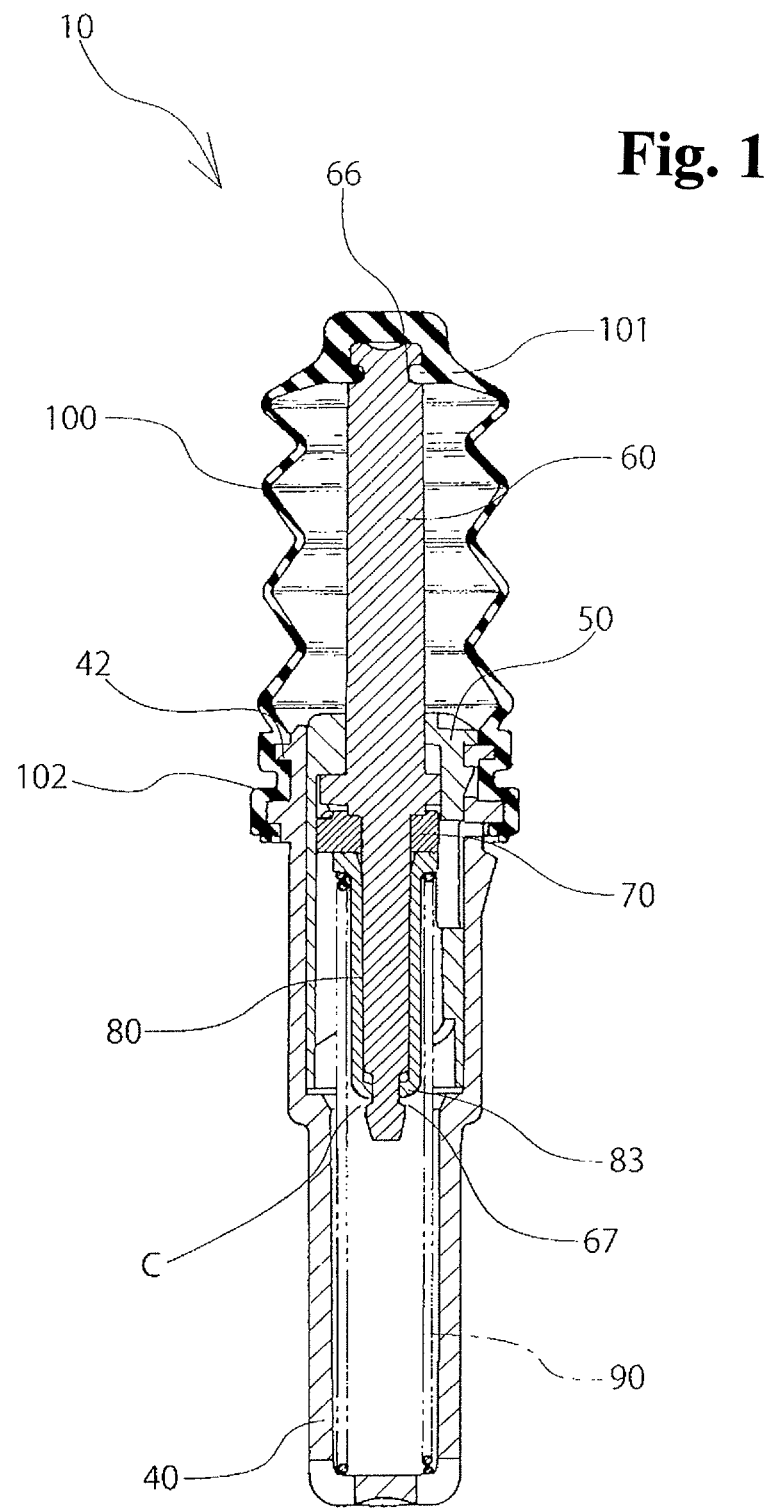
FIG. 1 is a cross-sectional view of a push-up device.
Figure 2:
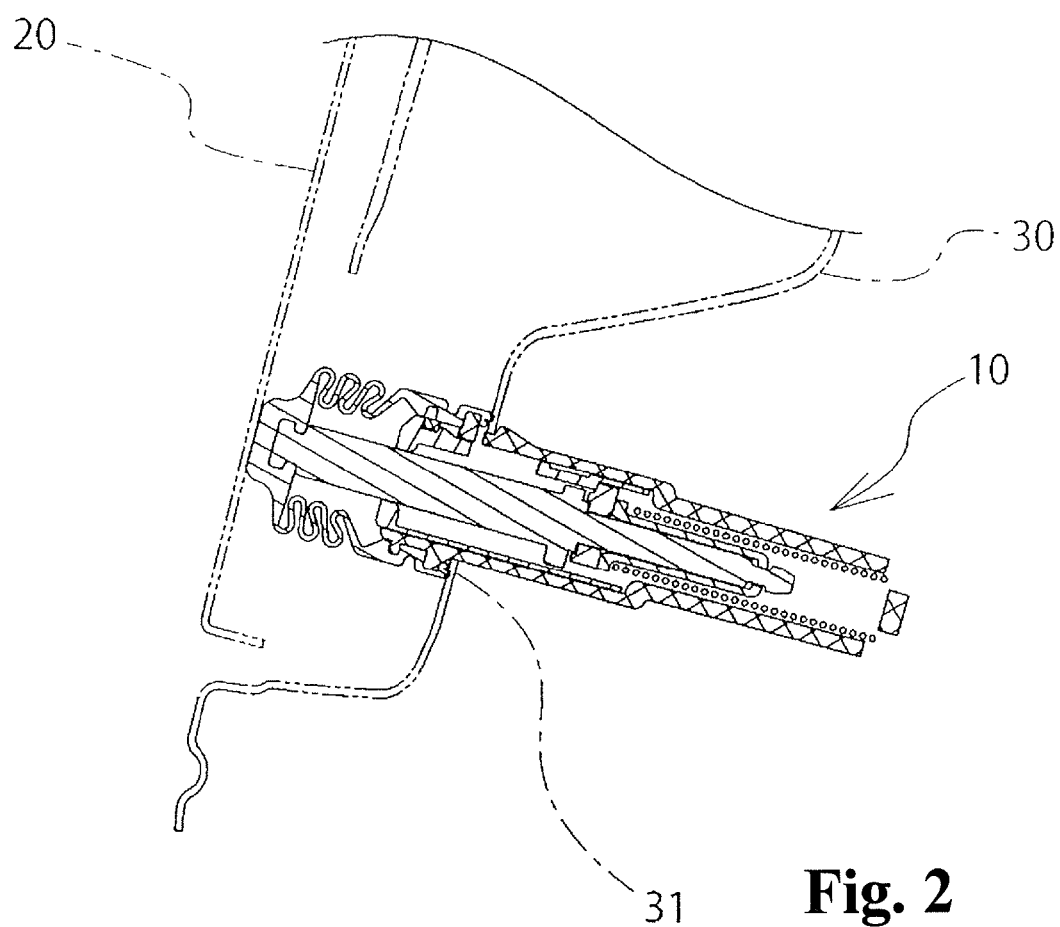
FIG. 2 is a schematic cross-sectional view for explaining an attachment state of the push-up device.
Figure 3:
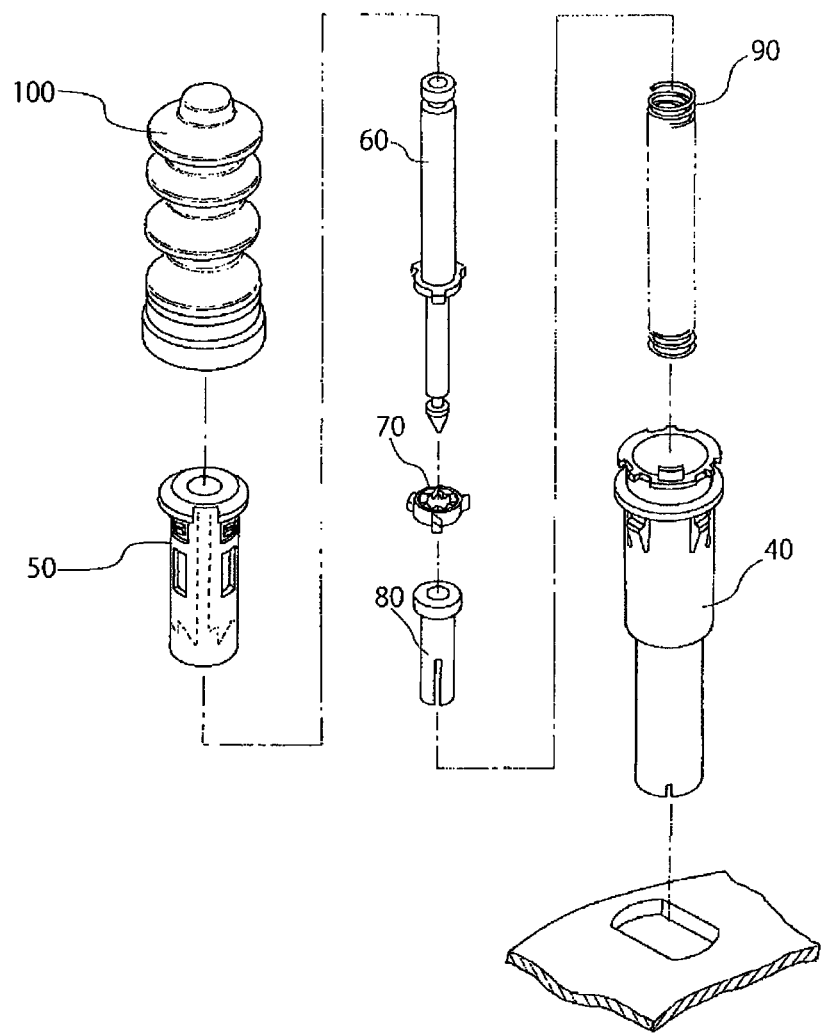
FIG. 3 is an exploded perspective view of the push-up device.

In FIGS. 1 to 3, the reference numeral 10 represents a push-up device for pushing out a fuel lid 20 openably and closably attached to a vehicle body in an opening direction.

Specifically, as shown in FIG. 2, the fuel lid 20 is openably and closably attached to an inner panel 30 through a hinge (not shown in the figures). In the inner panel 30, there is provided a square-shaped attachment hole 31 passing through front and back surfaces, and the push-up device 10 is fixed to the attachment hole 31.

As shown in FIG. 3, the push-up device 10 roughly comprises the following parts.

Incidentally, the following (1) to (7) will be described hereinafter.

(1) Case 40
(2) Cap 50
(3) Rod 60
(4) Rotor 70
(5) Sleeve 80
(6) Spring 90
(7) Boot 100

Incidentally, the parts of the push-up device 10 are not limited to the aforementioned (1) to (7).

(Case 40)

As shown in FIG. 2, the case 40 is fixed to a vehicle body side, and formed in a cylinder shape.

Figure 9:
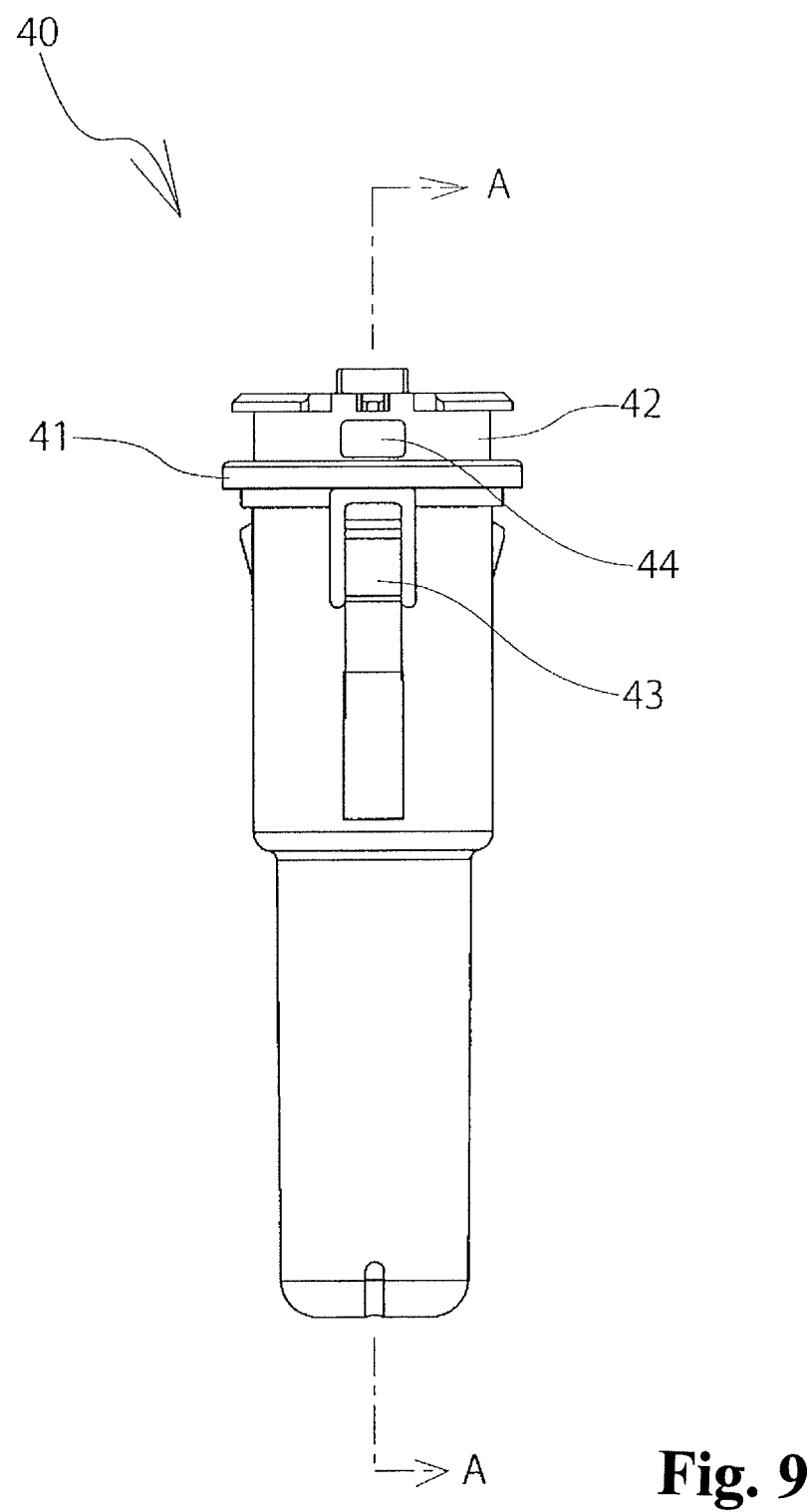
FIG. 9 is a side view of a case.
Figure 10:
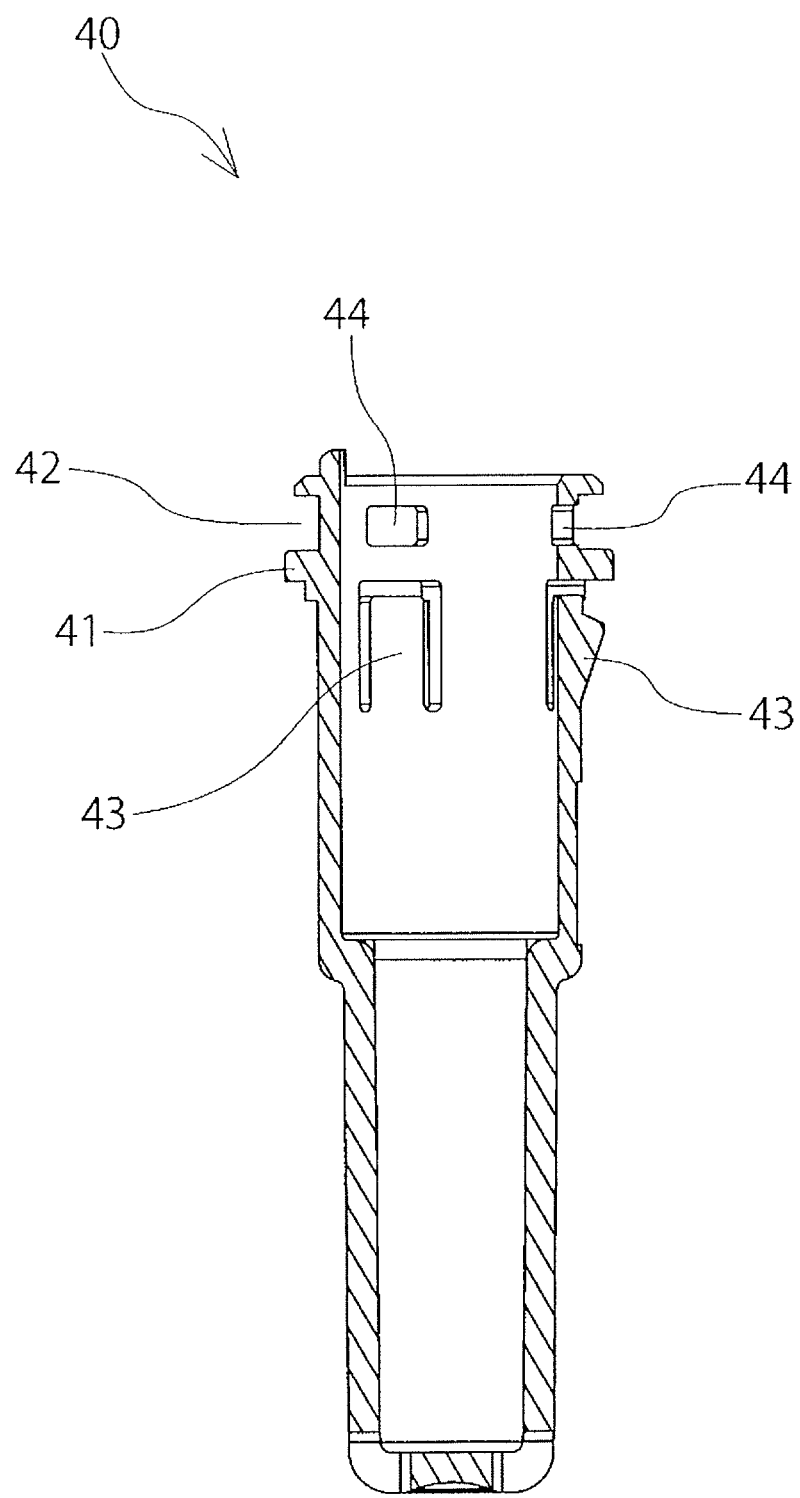
FIG. 10 is a cross-sectional view taken along a line A-A in FIG. 9.

Specifically, as shown in FIGS. 9 and 10, the case 40 is formed in the cylinder shape whose upper surface is open, and bottom surface is closed. An external shape of the case 40 is set to be smaller than an inner diameter of the attachment hole 31 of the inner panel 30.

In the case 40, a flange portion 41 projecting outwardly in a radial direction is provided in an upper portion of the opening.

On an upper side of the flange portion 41, there is provided an annular attachment concave portion 42 attaching the boot 100 described hereinafter.

Also, on a lower side of the flange portion 41, there is provided a plurality, for example, three pieces of elastic claws 43 elastically protruding from an outer circumference of the case 40 in a radial fashion. The elastic claws 43 are positioned away from a lower surface of the flange portion 41 while maintaining an interval of a plate thickness of the inner panel 30.

As shown in FIG. 2, when the case 40 is matched to and fitted in the attachment hole 31, the elastic claws 43 recede once, elastically return at a back surface side of the inner panel 30, and sandwich the inner panel 30 between the elastic claws 43 and the lower surface of the flange portion 41, so that the case 40 is fixed to the attachment hole 31.

(Cap 50)

As shown in FIG. 1, the cap 50 is attached to the upper surface of the opening of the case 40, and closes the upper surface of the opening.

Specifically, as shown in FIGS. 11 to 14, the cap 50 roughly comprises a lid portion 51 which is one size larger than the upper surface of the opening of the case 40, and a cylinder portion 52 which is made small for one step from a lower surface of the lid portion 51, and extends in the cylinder shape.

Figure 13:
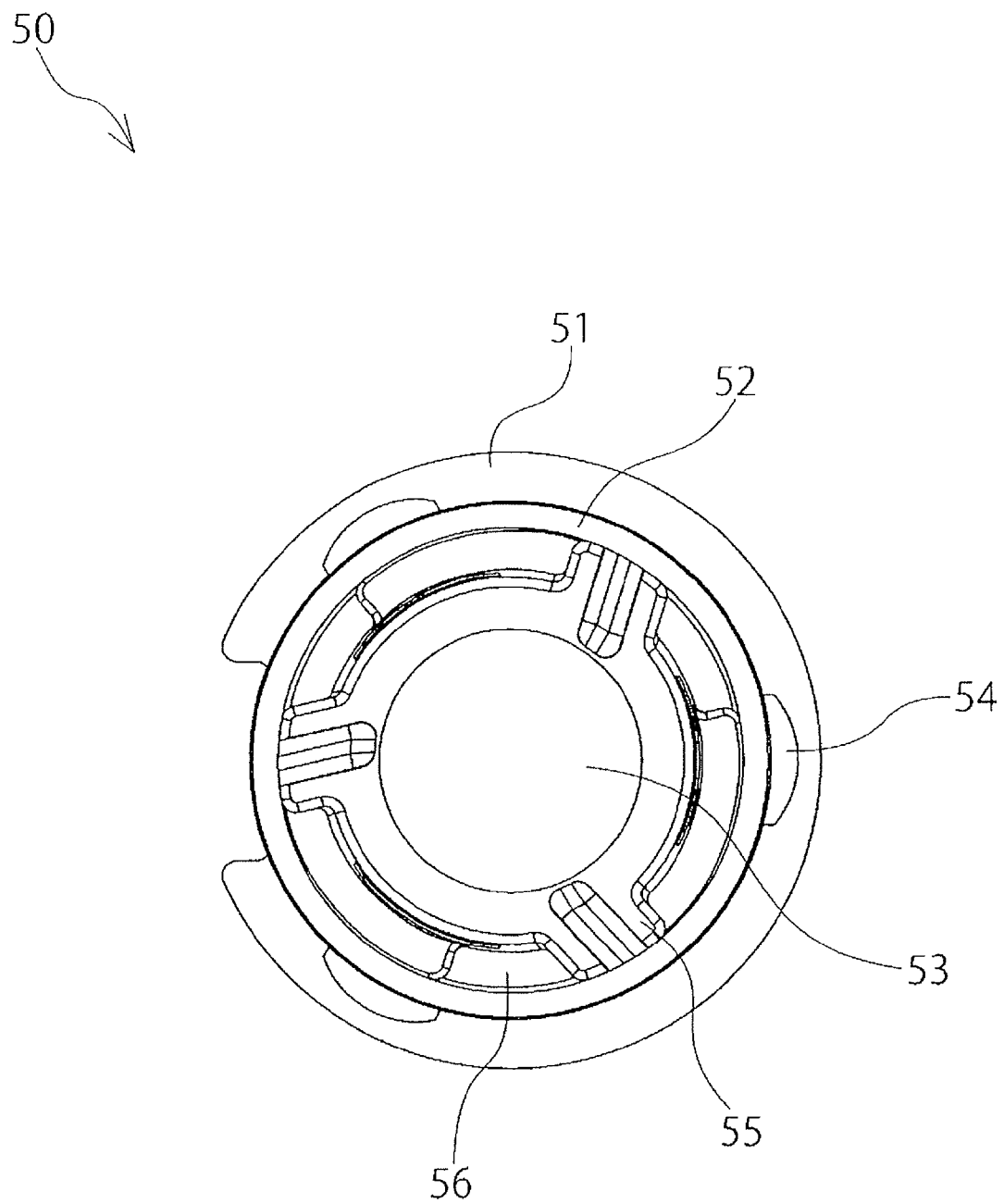
FIG. 13 is a bottom view of the cap.
Figure 14:
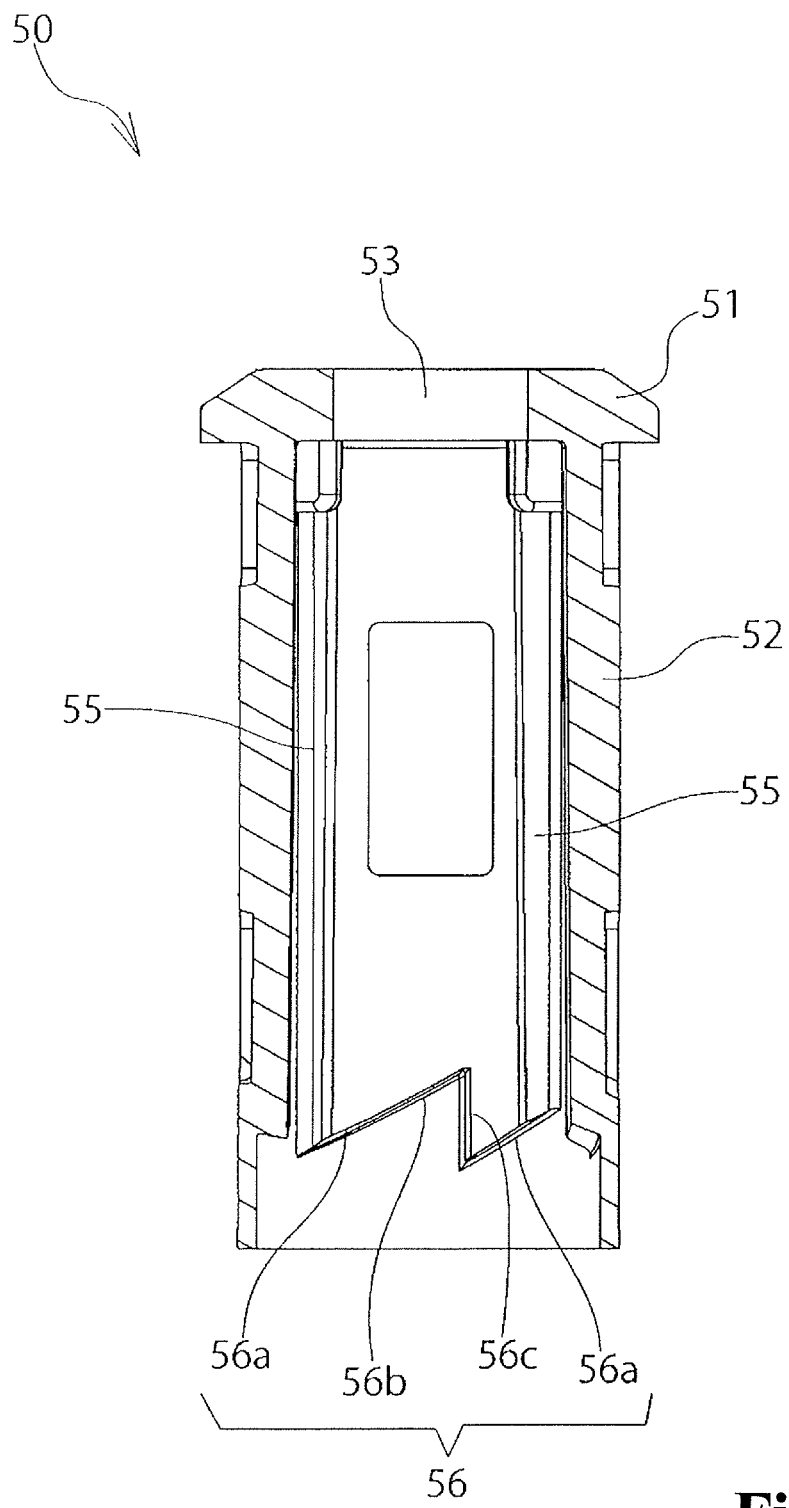
FIG. 14 is a cross-sectional view taken along a line B-B in FIG. 12.

As shown in FIGS. 13 and 14, in the lid portion 51, there is provided a circular through-bore 53 passing through up and down. In the through-bore 53, the later-mentioned rod 60 is inserted to pass through.

As shown in FIG. 1, the cylinder portion 52 has an outer circumference thereof set to be smaller than the inner diameter of the case 40, and is inserted into the case 40.

Figure 11:
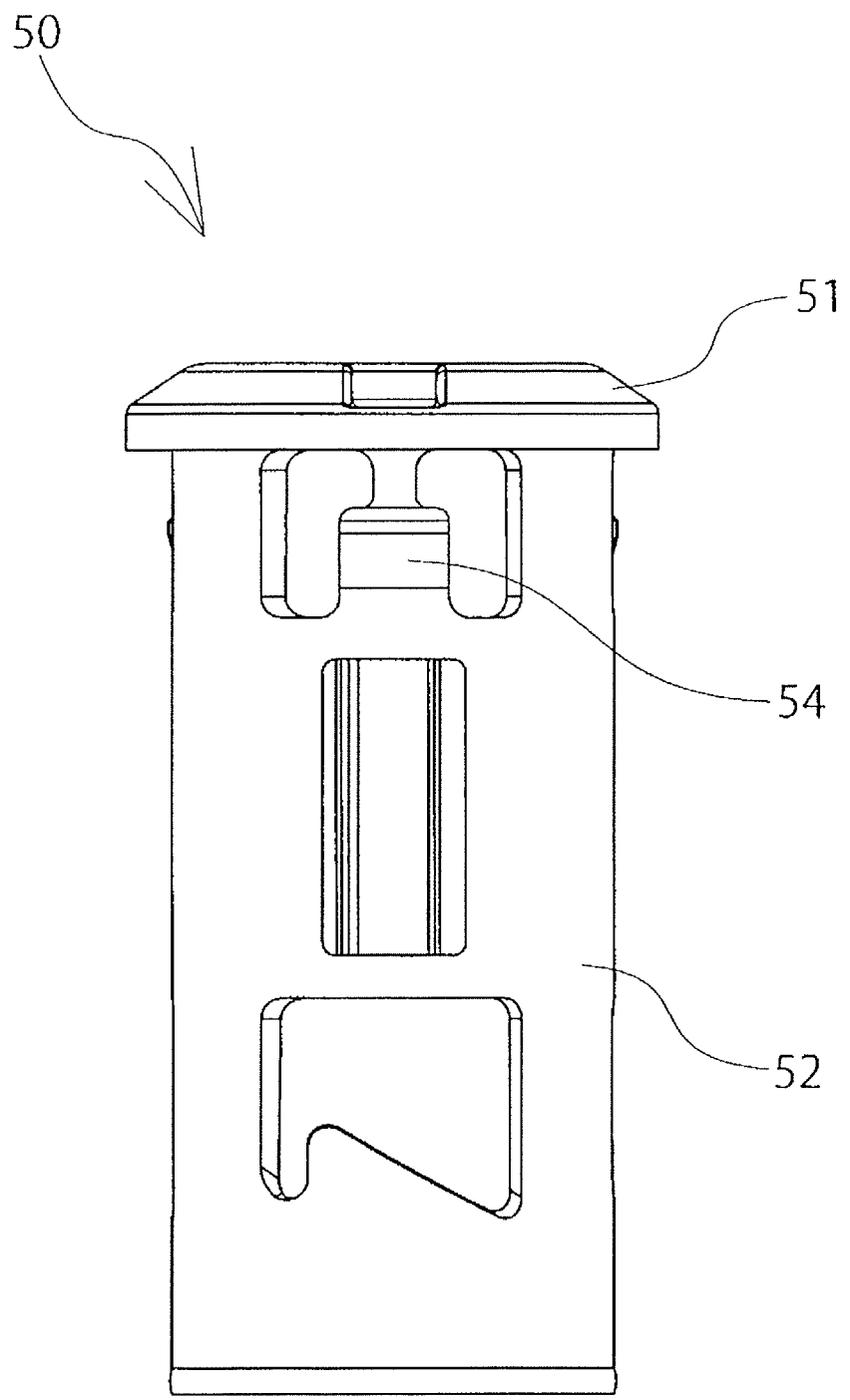
FIG. 11 is a side view of a cap.
Figure 12:
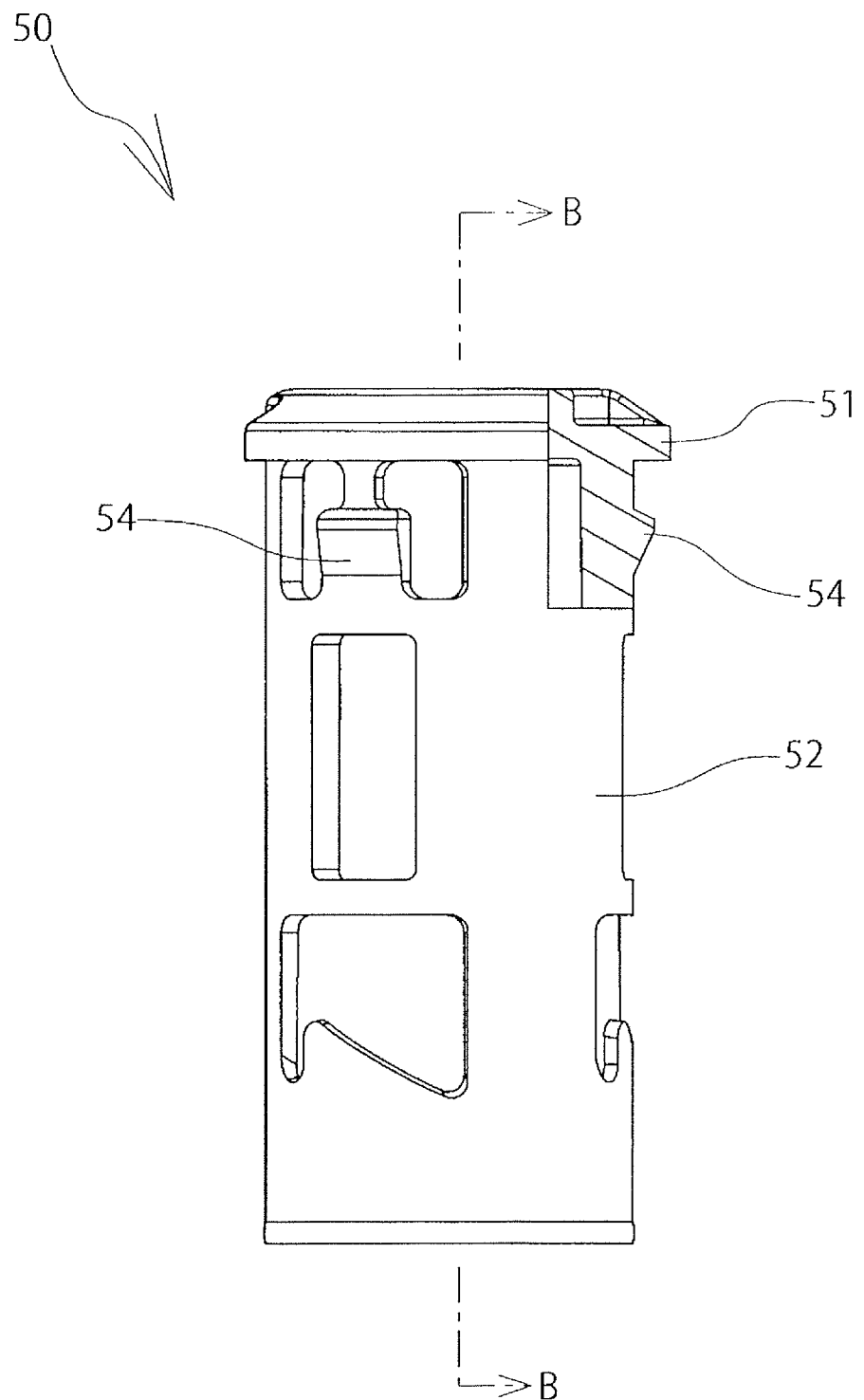
FIG. 12 is a side view viewed from the other side surface of the cap, wherein one portion is made a cross-sectional surface.

As shown in FIGS. 11 to 13, on the outer circumference of the cylinder portion 52, there is provided a plurality, for example, three pieces of locking claws 54 elastically protruding in the radial fashion. On the other hand, as shown in FIGS. 9 and 10, in the attachment concave portion 42 of the case 40, there are provided locking holes 44 wherein the locking claws 54 are fitted in, and which pass through an inside and outside.

As shown in FIG. 1, when the cylinder portion 52 is matched to and fitted in the upper surface of the opening of the case 40, the locking claws 54 recede once, and after that, the locking claws 54 are elastically fitted in the locking holes 44, so that the cap 50 is fixed to the case 40.

On the other hand, as shown in FIGS. 13 and 14, on an inner circumferential surface of the cylinder portion 52, there are provided slide grooves 55 provided so as to be depressed on the inner circumferential surface of the cylinder portion 52. The slide grooves 55 are for holding the rod 60 so as to be capable of sliding and incapable of rotating.

Specifically, as shown in FIGS. 13 and 14, a plurality, for example, three pieces of the slide grooves 55 is provided in the radial fashion, and upper end portions of the slide grooves 55 are closed, and lower end portions of the slide grooves 55 are open.

Also, as shown in FIGS. 13 and 14, on the lower sides of the slide grooves 55, there are provided lock grooves 56 provided so as to be depressed on the inner circumferential surface of the cylinder portion 52. The lock grooves 56 are for locking the after-mentioned rotor 70 so as to be incapable of rotating.

Specifically, as shown in FIGS. 13 and 14, the lock grooves 56 are formed within an interval of adjacent slide grooves 55, and formed in a saw-tooth shape along a circumferential direction of the inner circumferential surface of the cylinder portion 52.

Specifically, as shown in FIGS. 6(a) to 8(b), and 14, as a basis for one slide groove 55, the lock groove 56 comprises first inclined surface portions 56a heading toward the front in a rotational direction (an arrow X in FIGS. 6(a) to 8(b)) of the after-mentioned rotor 70 from the slide groove 55, and inclined upward to an upper side; lock portions 56b positioned in inclination-upper end portions of the first inclined surface portions 56a, i.e., in front in the rotational direction of the rotor 70, wherein engagement projections 73 of the later-mentioned rotor 70 are fitted in; vertical portions 56c which are sheer downwardly from the lock portions 56b; and second inclined surface portions 56d inclined upward to the upper side from lower end portions of the vertical portions 56c, wherein the inclination-upper end portions face one of the other slide grooves 55 positioned in front in the rotational direction of the rotor 70.

Inclination-lower end portions of the first inclined surface portions 56a, i.e., the back in the rotational direction of the rotor 70 face one of the slide grooves 55. Also, an inclination angle of the first inclined surface portions 56a and the second inclined surface portions 56d is conformed.

(Rod 60)

As shown in FIGS. 1 and 2, the rod 60 is slidably held inside the case 40, and protrudes from the inside of the case 40 so as to push out the fuel lid 20.

Figure 15:
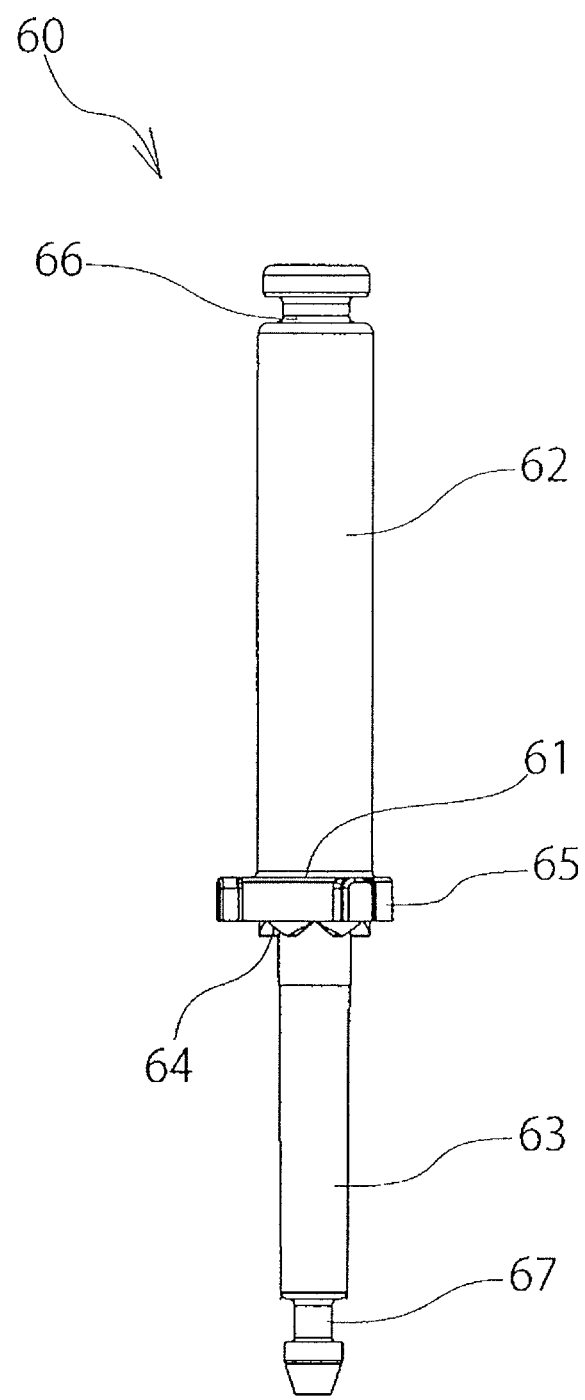
FIG. 15 is a side view of the rod.
Figure 16:
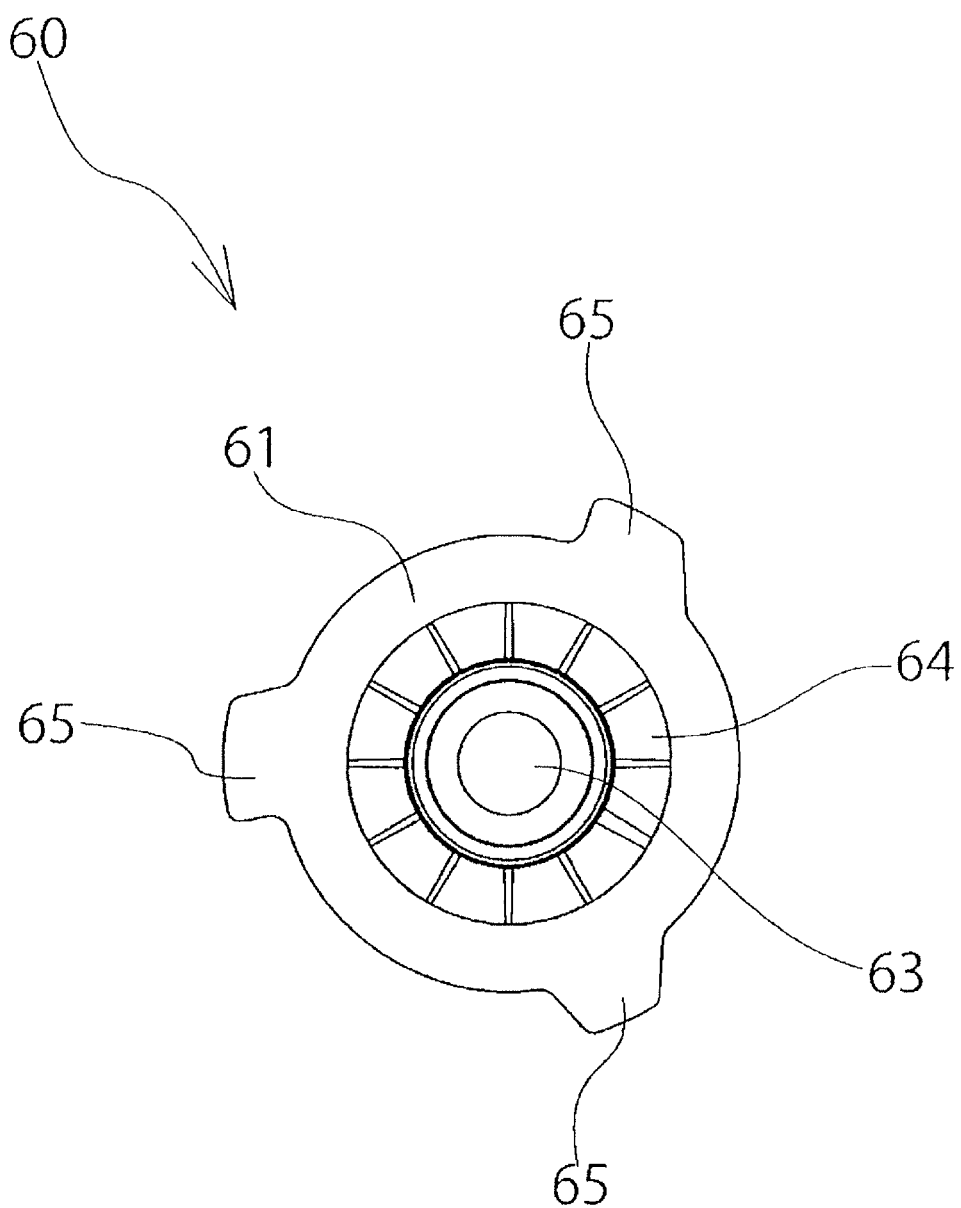
FIG. 16 is a bottom view of the rod.

Specifically, as shown in FIGS. 15 and 16, the rod 60 is formed in a columnar shape, and roughly comprises a cam portion 61 positioned at some point along an axis direction, and protruding outwardly in the radial direction; an upper-side rod portion 62 positioned on an upper side of the cam portion 61, and protruding from the inside of the case 40 so as to push out the fuel lid 20; and a lower-side rod portion 63 positioned on a lower side of the cam portion 61, wherein the after-mentioned spring 90 is inserted to pass through.

As shown in FIGS. 15 and 16, on a lower surface of the cam portion 61, there is formed a stationary-side cam 64 which engages a movable-side cam surface 72 of the after-mentioned rotor 70. The stationary-side cam 64 is formed in a continuous fashion along the circumferential direction of the lower surface of the cam portion 61, and formed in a pure angular wave-tooth shape.

As shown in FIGS. 15 and 16, on an outer circumference of the cam portion 61, there is formed a plurality, for example, three pieces of slide projections 65 protruding in the radial fashion. As shown in FIG. 1, the slide projections 65 are fitted in the slide grooves 55 of the cap 50 to each other, and rise and descend along the slide grooves 55, so that the rod 60 is held inside the cap 50 so as to be capable of sliding and incapable of rotating.

On an upper end portion of the upper-side rod portion 62, there is provided an annular groove 66 which is annular and attaches the after-mentioned boot 100.

Figure 5:
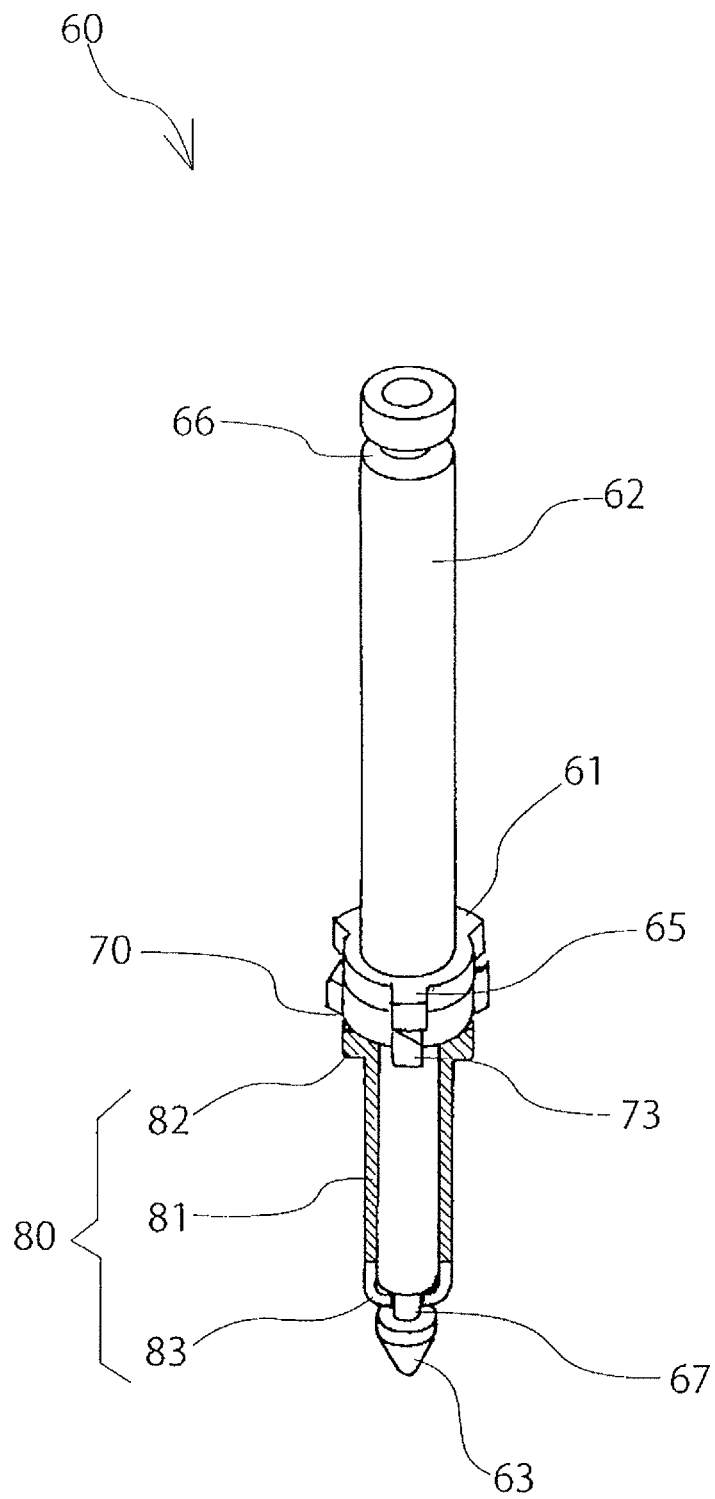
FIG. 5 is a perspective view in which the rod, the rotor, and a sleeve are assembled.

As shown in FIGS. 5 and 15, on a lower end portion of the lower-side rod portion 63, there is provided a constricted portion 67 which is slenderized so that a contracted-diameter portion 83 of the after-mentioned sleeve 80 is fitted in.

Specifically, as shown in FIG. 1, a height of the constricted portion 67 is set to be higher than a thickness in an up-and-down direction of the contracted-diameter portion 83. Consequently, in a state wherein the contracted-diameter portion 83 is fitted in the constricted portion 67, a clearance C is produced in a height direction of the constricted portion 67. Accordingly, the contracted-diameter portion 83 can rise and descend up and down for a portion of the clearance C of the constricted portion 67.

An amount of the clearance C is set according to a rising and descending amount of the rotor 70 which rises and descends between a first height position in which the movable-side cam 72 of the after-mentioned rotor 70 is engaged with the stationary-side cam 64 of the cam portion 61, and a second height position disengaging from the stationary-side cam 64. In the present embodiment, although the amount of the clearance C is set in, for example, "0.4 mm", the amount is not limited to the aforementioned numerical value.

(Rotor 70)

Figure 4:
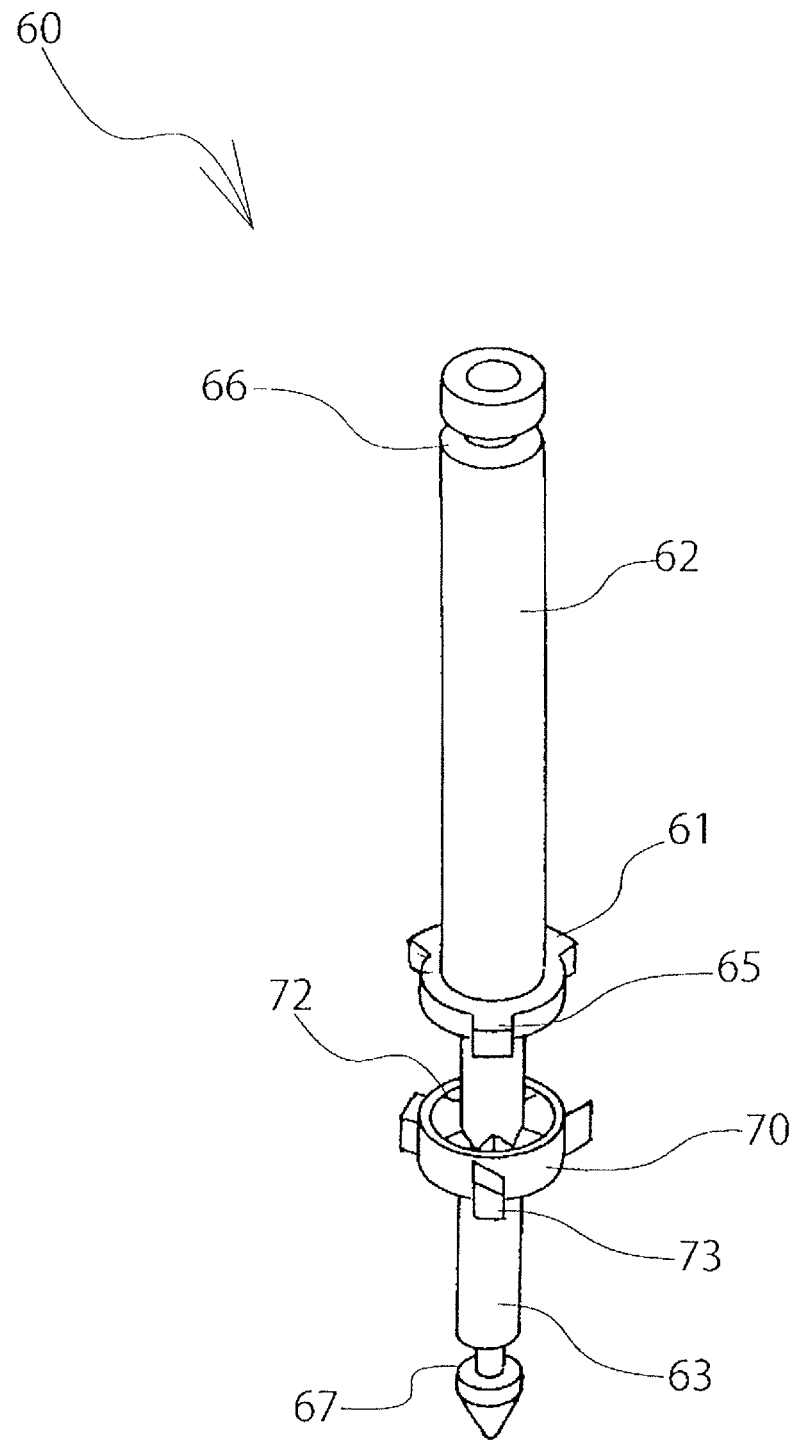
FIG. 4 is a perspective view in which a rod and a rotor are assembled.

As shown in FIG. 4, the rotor 70 is supported in the lower-side rod portion 63 so as to be capable of rotating and sliding in the axis direction.

Figure 17:
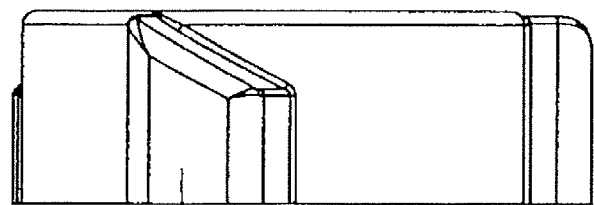
FIG. 17 is a side view of the rotor.
Figure 18:
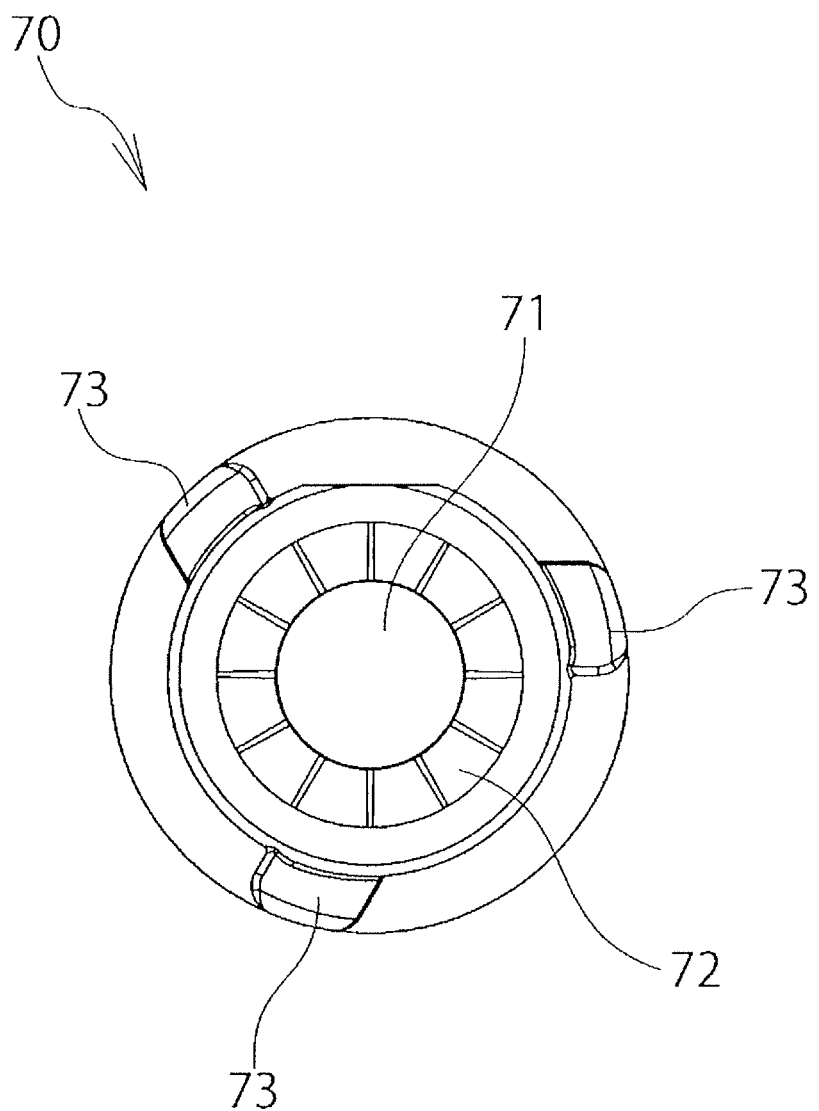
FIG. 18 is a plan view of the rotor.
Figure 19:
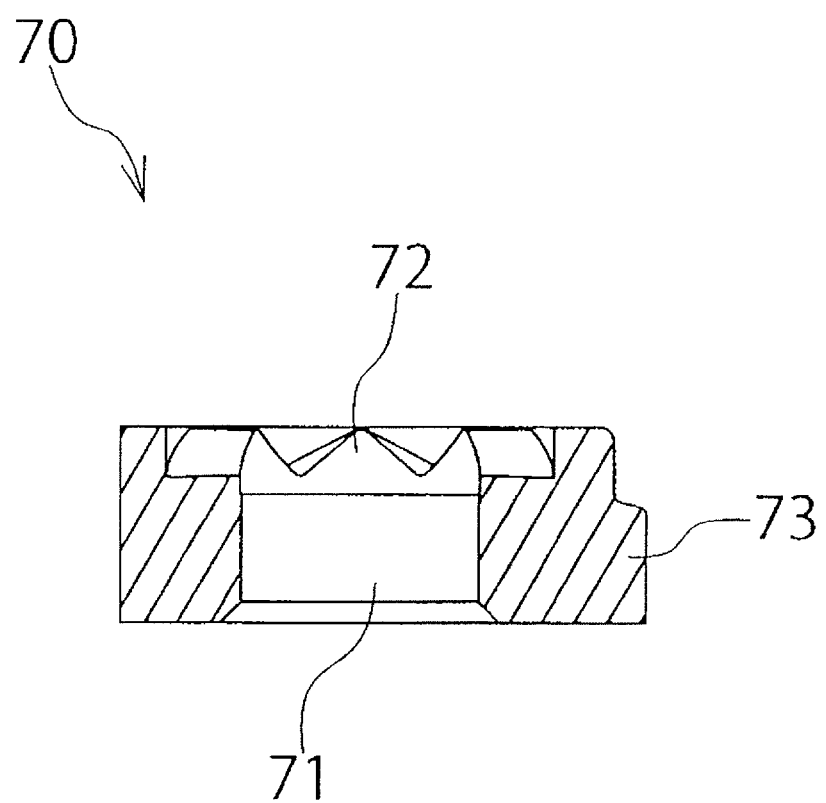
FIG. 19 is a cross-sectional view of the rotor.

Specifically, as shown in FIGS. 17 to 19, the rotor 70 is formed in a doughnut shape, and comprises a center hole 71 passing through up and down in the center and inserted to pass through the lower-side rod portion 63; and the movable-side cam 72 formed in an upper surface, engaging the stationary-side cam 64 of the cam portion 61, and also disengaging by sliding of the rod 60 for providing a rotational force in one direction.

The movable-side cam 72 forms a shape complementary to the stationary-side cam 64, is formed in the continuous fashion along the circumferential direction of the upper surface of the rotor 70, and formed in the pure angular wave-tooth shape.

As shown in FIGS. 17 to 19, on the outer circumference of the movable-side cam 72, there is formed a plurality, for example, three pieces of the engagement projections 73 protruding in the radial fashion.

Figure 8A:
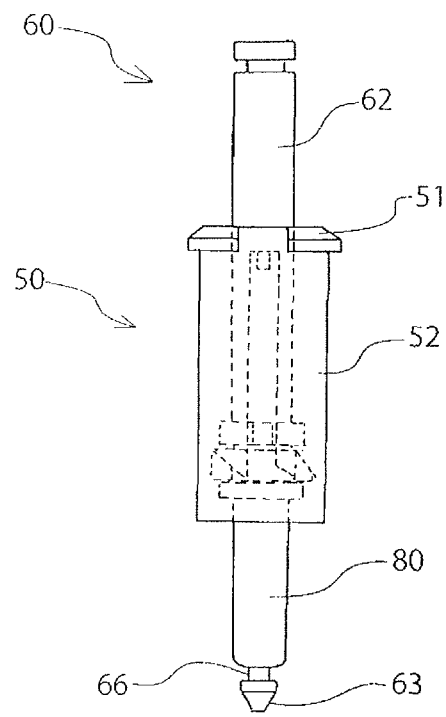
FIGS. 8(a) and 8(b) correspond to FIGS. 6(a) and 6(b), and are explanatory drawings of a lock state of the lock device.
Figure 8B:
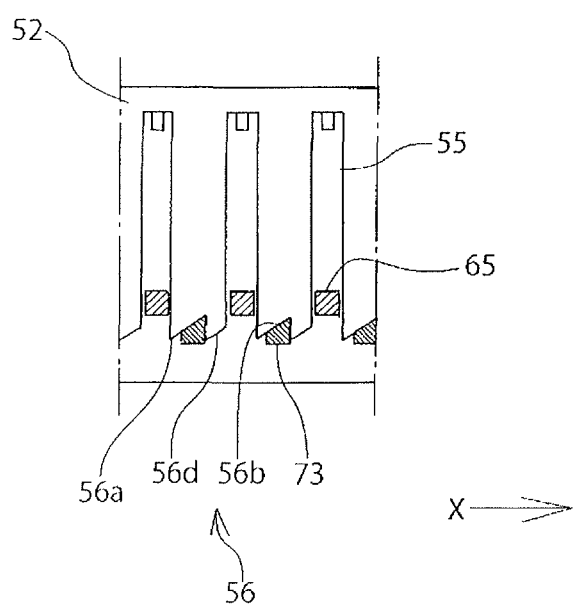

As shown in FIGS. 8(a) and 8(b), the engagement projections 73 are fitted in the lock portions 56b of the lock grooves 56 of the cap 50, and formed in a planar trapezoidal shape including an inclined surface on the upper surface. The inclined surface of the trapezoidal shape corresponds to the inclination angle between the first inclined surface portions 56a and the second inclined surface portions 56d of the lock grooves 56.

Figure 6A:
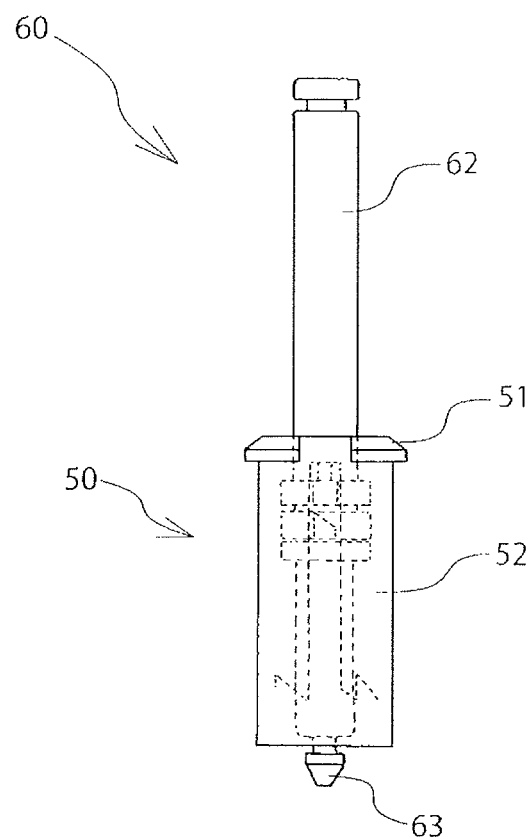
FIGS. 6(a) and 6(b) are explanatory drawings for explaining a movement of a lock device.
Figure 6B:
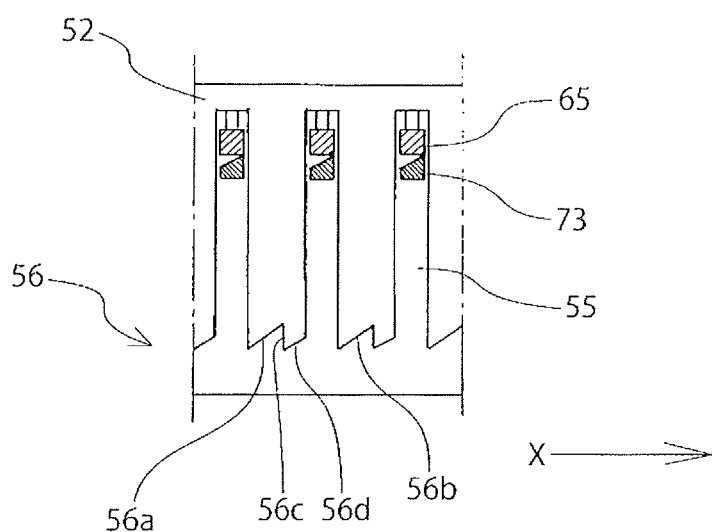
Figure 7A:
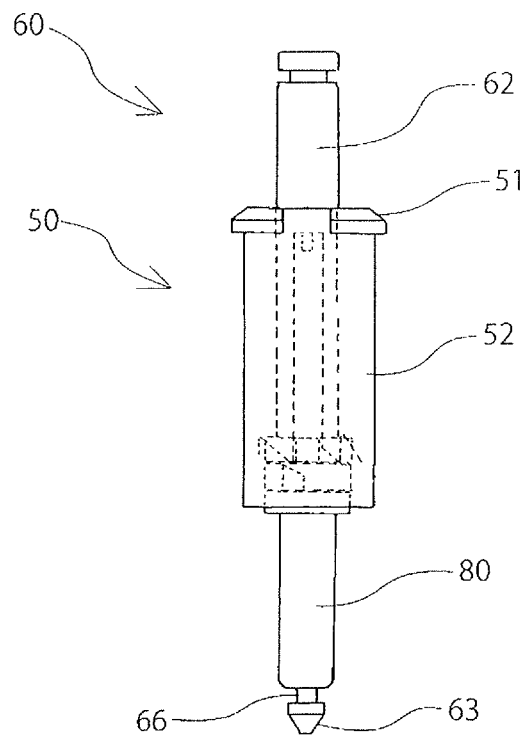
Figure 7B:
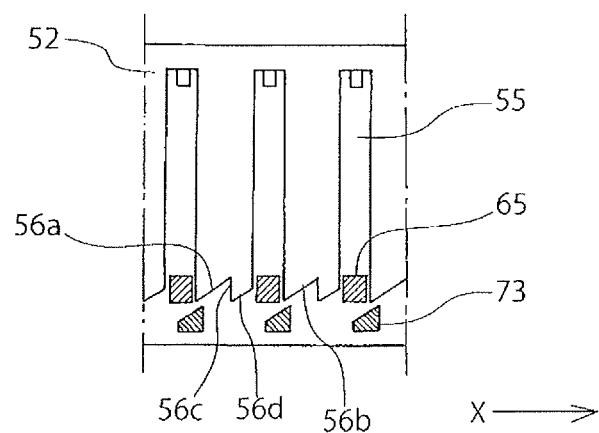

Also, as shown in FIGS. 6(a) and 6(b), a horizontal width in a right-and-left direction of the engagement projections 73 is set to be smaller than a groove width of right and left of the slide grooves 55 of the cap 50 so that the engagement projections 73 can slide in the slide grooves 55.

On the other hand, the engagement projections 73 constitute a lock device together with the lock grooves 56 of the cap 50. As shown in FIGS. 6(a) to 8(b), the lock device is positioned between the case 40 and the rod 60 for locking the rod 60 in a backward-movement position of the case 40 against an urging force of the spring 90 (an urging device). Incidentally, although the lock device is constituted by the engagement projections 73 and the lock grooves 56, the lock device is not limited to the above, and in the present embodiment, the cam portion 61 and the slide projections 65 of the rod 60, the slide grooves 55 of the cap 50, and the like also function as one component of the lock device.

(Sleeve 80)

As shown in FIG. 5, the sleeve 80 is inserted to pass through the lower-side rod portion 63, positioned between the rotor 70 and the later-mentioned spring 90, and also restricts a movement of the rod 60 in a sliding direction in a lock position wherein the rod 60 is shortened, i.e., prevents the rod 60 from wobbling in a direction in which the stationary-side cam 64 and the movable-side cam 72 are distanced, i.e., the up-and-down direction in a state wherein the stationary-side cam 64 and the movable-side cam 72 are engaged with each other.

Figure 20:
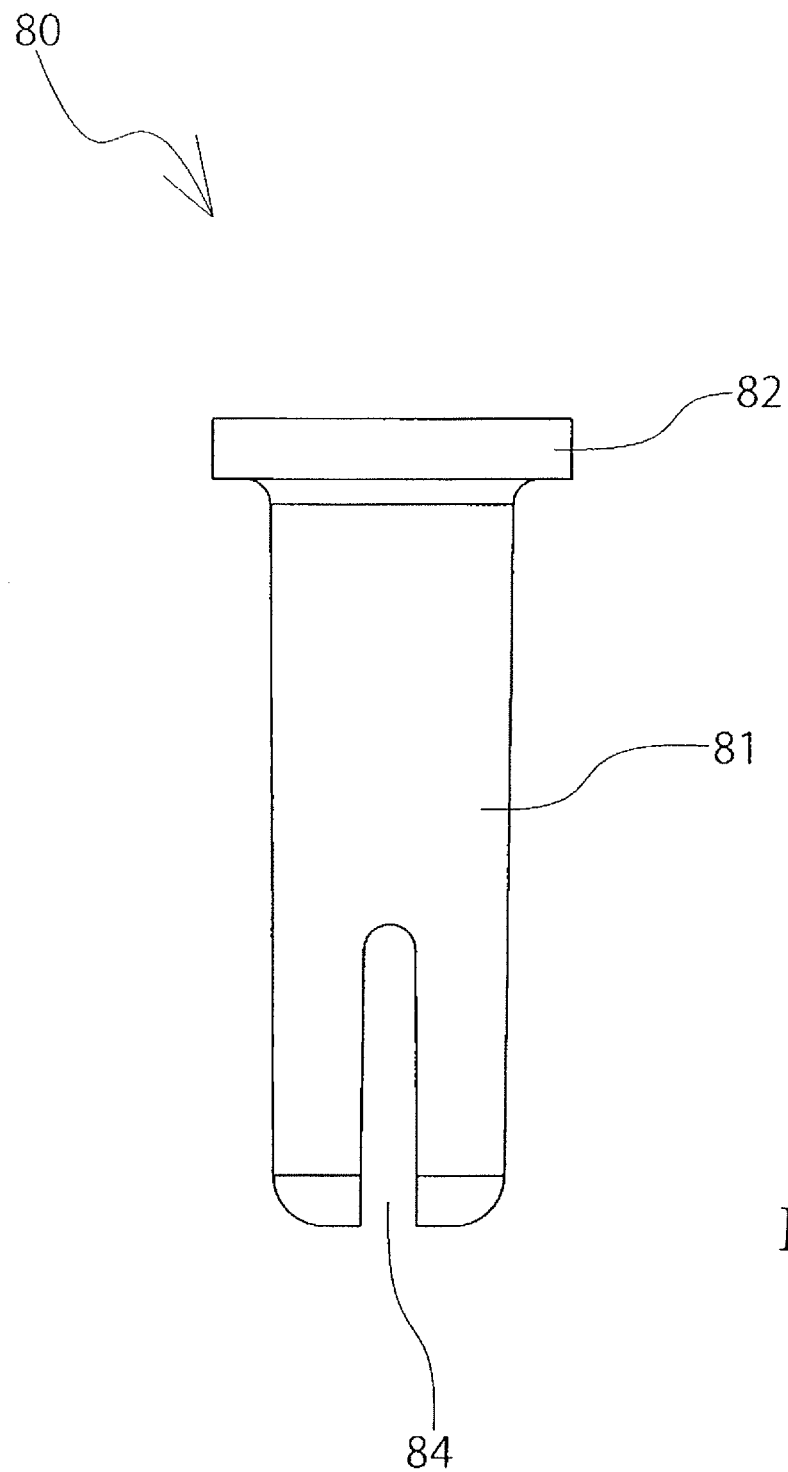
FIG. 20 is a side view of the sleeve.
Figure 21:
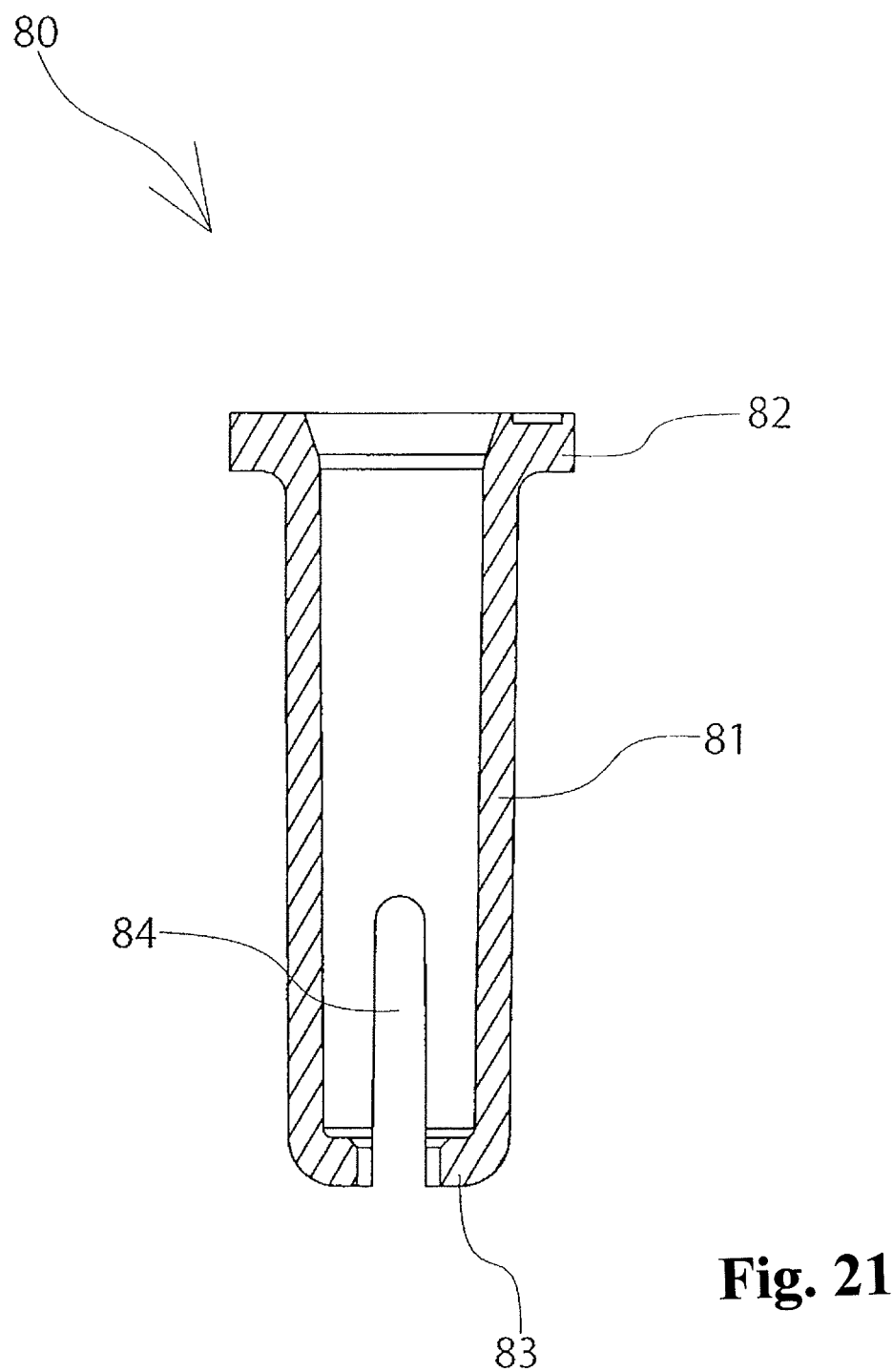
FIG. 21 is a cross-sectional view of the sleeve.

Specifically, as shown in FIGS. 20 and 21, the sleeve 80 comprises the following respective portions.

(1) Sleeve Main Body 81

As shown in FIGS. 5 and 21, the sleeve main body 81 is inserted to pass through the lower-side rod portion 63, and formed in the cylinder shape.

(2) Projecting Portion 82

As shown in FIGS. 20 and 21, a projecting portion 82 is positioned in an upper end portion of the sleeve main body 81 abutting against the rotor 70, and annularly projects outwardly in the radial direction.

(3) Contracted-Diameter Portion 83

As shown in FIG. 21, the contracted-diameter portion 83 is positioned in a lower end portion of the sleeve main body 81 on a side opposite to the upper end portion, and annularly protrudes inwardly in the radial direction.

(4) Slits 84

As shown in FIGS. 20 and 21, slits 84 are for dividing the lower end portion of the sleeve main body 81 into a plurality, for example, two.

Specifically, the slits 84 are formed as a pair in a diametrical direction of the sleeve main body 81, and formed up to some point toward an upside from an end surface of a lower side of the sleeve main body 81.

Incidentally, although the slits 84 are formed, for example, as a pair, three or more slits 84 may be formed.

(Spring 90)

As shown in FIG. 1, the spring 90 is positioned between the case 40 and the rod 60 for urging the rod 60 toward a direction protruding from the inside of the case 40, and functions as the urging device.

Specifically, as shown in FIG. 1, the spring 90 is inserted to pass through the sleeve 80 in a state wherein the rotor 70 and the sleeve 80 are inserted to pass through the lower-side rod portion 63 of the rod 60. The spring 90 is compressed between the projecting portion 82 of the sleeve 80 and a bottom of the case 40.

(Boot 100)

As shown in FIGS. 1 to 3, the boot 100 can expand and contract so as to cover the upper-side rod portion 62 protruding from the case 40, and is attached to the flange portion 41 of the case 40.

Specifically, as shown in FIGS. 1 to 3, the boot 100 is formed in a hollow concertina fashion whose lower surface is open, and an upper end portion of the boot 100 is closed in a bag shape.

As shown in FIG. 1, on an inner circumferential surface of the upper end portion of the boot 100, there is provided an annular projection 101 annularly projecting inwardly in the radial direction. The annular projection 101 is fitted in the annular groove 66 of the rod 60.

On the inner circumferential surface of an opening lower surface of the boot 100, there is provided an annular convex portion 102 annularly protruding inwardly in the radial direction. The annular convex portion 102 is fitted in the annular concave portion 42 of the flange portion 41 of the case 40, and the boot 100 is fixed relative to the case 40.

(Movement of Push-Up Device 10)

Next, a movement of the push-up device 10 comprising the aforementioned structure will be explained.

As shown in FIG. 1, in an assembled state, the push-up device 10 is fixed to the inner panel 30 by matching and fitting the case 40 in and to the attachment hole 31 as shown in FIG. 2.

In a state wherein the fuel lid 20 is closed, as shown in FIG. 2, the push-up device 10 is locked in a lock state wherein the rod 60 is shortened (see FIGS. 8(a) and 8(b)).

When the fuel lid 20 is pushed in, the rod 60 is pushed into the case 40, and the lock state is released. Due to a compressive restoring force of the spring 90, the rod 60 protrudes from the inside of the case 40 so as to push-open the fuel lid 20.

Consequently, the pushed-open fuel lid 20 can be easily opened by hand.

On the other hand, when the opened fuel lid 20 is closed by hand, the rod 60 is pushed in toward the case 40 so as to be locked in the shortened lock state.

(Movement of Lock Device)

A movement of the lock device will be explained.

As shown in FIGS. 8(a) and 8(b), in the lock state wherein the rod 60 is shortened, the engagement projections 73 of the rotor 70 engage the lock grooves 56 of the cap 50 so as to be fitted in the lock portions 56b.

When the rod 60 is pushed into the case 40, although it is not shown in the figures, the rotor 70 descends by being pushed by the cam portion 61 of the rod 60.

Consequently, although it is not shown in the figures, the engagement, projections 73 of the rotor 70 are disengaged from the lock portions 56b of the cap 50.

At this time, an engagement between the stationary-side cam 64 of the cam portion 61 of the rod 60 and the movable-side cam 72 of the rotor 70 is disengaged, and the rotor 70 rotates in a direction of the arrow X in FIG. 8(b).

Next, when a force pushing the rod 60 in is released, the rotor 70 is pushed up due to the compressive restoring force of the spring 90.

At this time, although it is not shown in the figures, the engagement projections 73 of the rotor 70 abut against the second inclined surface portions 56d of the cap 50. Consequently, the engagement projections 73 ascend while sliding and contacting the second inclined surface portions 56d so as to be fitted in the slide grooves 55 from the upper end portions of the inclined surfaces of the second inclined surface portions 56d (see FIGS. 6(a) and 6(b)).

As shown in FIGS. 6(a) and 6(b), when the engagement projections 73 are fitted in the slide grooves 55, the engagement projections 73 are allowed to ascend along the slide grooves 55.

Consequently, due to the compressive restoring force of the spring 90, through the rotor 70, the cam portion 61 of the rod 60 is pushed up, and the rod 60 protrudes from the case 40 so as to extend.

On the other hand, when the extended rod 60 is pushed into the case 40, although it is not shown in the figures, the engagement projections 73 of the rotor 70 descend along the slide grooves 55.

Next, when the engagement projections 73 come out of opening lower ends of the slide grooves 55, the rotor 70 is allowed to rotate.

Consequently, due to a disengagement between the stationary-side cam 64 and the movable-side cam 72, the rotor 70 rotates in the direction of the arrow X in FIGS. 6(a), 6(b), 7(a), and 7(b), and moves toward the first inclined surface portions 56a of the lock grooves 56 from the lower side of the slide grooves 55.

Next, when the force pushing the rod 60 in is released, the rotor 70 is pushed up due to the compressive restoring force of the spring 90, and at this time, the engagement projections 73 abut against the first inclined surface portions 56a. Consequently, the engagement projections 73 ascend while sliding and contacting the first inclined surface portions 56a so as to be fitted in the lock portions 56b, and return to the lock state again.

All contents of the specification, claims, drawings, and abstract of Japanese Patent Applications No. 2009-151050 filed on Jun. 25, 2009 are cited in their entireties herein and are incorporated as a disclosure of the specification of the present invention.

What is claimed is:

1. A push-up device for pushing out a fuel lid openably and closably attached to a vehicle body, in an opening direction, comprising:
    a cylinder-shaped case fixed to a vehicle body side;
    a rod slidably held inside the case, and protruding from an inside of the case to push out the fuel lid;
    an urging device positioned between the case and the rod for urging the rod toward a direction protruding from the inside of the case; and
    a lock device positioned between the case and the rod for locking the rod in a backward-movement position of the case against an urging force of the urging device,
    wherein the lock device comprises:
    a cam portion positioned in a middle along an axis direction of the rod, protruding outwardly in a radial direction, and also including a stationary-side cam formed in a back surface in a protruding direction of the rod;
    a rotor supported in a lower-side rod portion positioned at a back in the protruding direction as a border of the cam portion so as to be capable of rotating and sliding in the axis direction, and including a movable-side cam, engaging the stationary-side cam of the cam portion, and also disengaging by sliding of the rod, for providing a rotational force in one direction;
    slide grooves positioned in one of an outer circumferential surface of the cam portion or an inner circumferential surface of the case, and extending in a sliding direction of the rod;
    slide projections positioned in the other of the outer circumferential surface of the cam portion or the inner circumferential surface of the case, and due to the sliding of the rod, relatively sliding inside the slide grooves so as to block a rotation of the rod relative to the case;
    engagement projections protruding from one of the outer circumferential surface of the rotor or the inner circumferential surface of the case; and
    lock grooves positioned in the other of the outer circumferential surface of the rotor or the inner circumferential surface of the case, and including lock portions in which the engagement projections are fitted in, wherein due to disengagement of the movable-side cam from the stationary-side cam, the rotor rotates so as to allow the engagement projections that have been fitted in the lock portions to be disengaged from the lock portions, and
    wherein the urging device comprises:
    a spring inserted to pass through the lower-side rod portion, and elastically shrunk inside the case for urging the rotor toward the cam portion; and
    a sleeve inserted to pass through the lower-side rod portion, and positioned between the rotor and the spring for restricting a movement of the rod in the sliding direction in a lock position of the lock device.

2. A push-up device according to claim 1, wherein the sleeve comprises a cylinder-shaped sleeve main body inserted to pass through the lower-side rod portion;
    a projecting portion positioned at an upper end portion of the sleeve main body abutting against the rotor, and projecting outwardly in the radial direction; and
    a contracted-diameter portion positioned at a lower end portion of the sleeve main body on a side opposite to the upper end portion, and protruding inwardly in the radial direction,
    wherein the lower-side rod portion comprises a constricted portion which is slenderized so that the contracted-diameter portion is fitted in, and wherein the constricted portion includes a clearance in the axis direction of the constricted portion, which allows the contracted-diameter portion to slide according to a rising and descending amount of the rotor which rises and descends between a first height position in which the movable-side cam of the rotor is engaged with the stationary-side cam of the cam portion, and a second height position disengaging from the stationary-side cam.

3. A push-up device according to claim 1, wherein in the case, a boot is fixed, which can expand and contract so as to cover an upper-side rod portion positioned in front in the protruding direction of the rod as the border of the cam portion.

4. A push-up device according to claim 1, wherein the case comprises a cap attached to an opening end portion positioned in front in the protruding direction of the rod, and the cap comprises the slide grooves and the lock grooves.

* * * * *